United States Patent [19]

Bissett

[11] Patent Number: 5,456,345
[45] Date of Patent: Oct. 10, 1995

[54] SELF-ADJUSTING CLUTCH MECHANISM

[75] Inventor: Kevin J. Bissett, Union Grove, Wis.

[73] Assignee: Twin Disc Incorporated, Racine, Wis.

[21] Appl. No.: 216,621

[22] Filed: Mar. 23, 1994

[51] Int. Cl.⁶ ..................................................... F16D 13/75
[52] U.S. Cl. .................................... 192/111 A; 192/70.25
[58] Field of Search .............................. 192/70.25, 111 A

[56] References Cited

U.S. PATENT DOCUMENTS

| | | | |
|---|---|---|---|
| 2,241,223 | 5/1941 | Spase et al. | 192/111 A |
| 2,280,355 | 4/1942 | Spase et al. | 192/111 A |
| 2,616,540 | 11/1952 | Miller | 192/111 A |
| 2,940,553 | 6/1960 | Newell et al. | 188/153 |
| 3,168,175 | 2/1965 | Straub et al. | 192/111 A X |
| 4,189,043 | 2/1980 | Steinhagen | 192/111 A |
| 4,445,600 | 5/1984 | Schmidt | 192/18 R |
| 5,029,687 | 7/1991 | Asada et al. | 192/70.25 X |
| 5,031,731 | 7/1991 | McKay | 188/196 BA |
| 5,069,322 | 12/1991 | Mizukami et al. | 192/70.25 |
| 5,090,536 | 2/1992 | Asada | 192/70.25 |
| 5,251,737 | 10/1993 | Flotow et al. | 192/111 A |
| 5,349,882 | 9/1994 | Kamio | 192/111 A X |

Primary Examiner—Rodney H. Bonck
Attorney, Agent, or Firm—Nilles & Nilles

[57] ABSTRACT

A self-adjusting mechanism compensates for wear of over-center clutches and the like and is adapted to mechanically sense clutch wear or slack when the clutch is engaged and to compensate for such wear or slack upon disengagement of the clutch. The self-adjusting mechanism preferably comprises a relatively durable and simple ratchet mechanism including teeth mounted on the adjusting ring and a pawl mounted on the clutch face plate. The pawl retracts upon clutch engagement by an amount determined by the thickness of the gap between the adjusting ring and the face plate which is in turn dependent at least in part on clutch wear, and advances upon clutch disengagement by an equal amount. Slack adjustment takes place when the pawl engages a new tooth upon retraction and then advances upon clutch disengagement to drive the tooth and thus the adjusting ring to rotate on the hub. The maximum stroke of the pawl, and thus the minimum adjusted gap between the adjusting ring and the face plate and the maximum torque transmitting capacity of the clutch, can be set by varying the effective length of the lever assembly supporting the pawl.

23 Claims, 6 Drawing Sheets

SELF-ADJUSTING CLUTCH MECHANISM

BACKGROUND OF THE INVENTION

1. Field of the Invention

The invention relates to clutches and, more particularly, relates to friction clutches having self-adjusting mechanisms for compensating for wear of the friction discs.

2. Discussion of Related Art

Clutches such as over-center power take off (PTO) clutches are well known to those skilled in the art and selectively transfer torque from a drive member such as a drive ring or a flywheel to a driven output shaft. The typical clutch includes a hub fixed to the shaft, a pack of friction discs connected to the drive member, a splined clutch face plate which is slidably mounted on the hub, and an adjusting ring which is threadedly mounted on the hub. The clutch is engaged under the operation of a suitable linkage assembly which typically comprises a yoke which is slidably mounted on the output shaft, a manually operated lever which slides the yoke on the shaft, and at least one over-center lever arm assembly. Each lever arm assembly comprises an over-center lever arm and a pivot link which are disposed between the yoke and the face plate and which are operable, upon sliding movement of the yoke toward the face plate, to drive the face plate toward the drive member, thereby compressing the friction discs and engaging the clutch. The lever arm of each over-center lever arm assembly also engages the drive ring so that the drive ring serves as a pivot point for the lever arm. The point at which the maximum forward stroke of the face plate terminates is thus dependent upon the position of the adjusting ring.

Normal use of a clutch results in wear of the friction discs and related components and eventually results in decreased capacity requiring replacement of the friction discs. The life of the clutch can be extended by compensating for clutch wear by threadedly mounting the adjusting ring on the hub so that, by rotating the adjusting ring on the hub and moving the adjusting ring axially towards the face plate, the pivot point for the over-center lever assembly is moved towards the clutch pack, thereby advancing the point at which the maximum forward stroke of the face plate terminates towards the disc stack and compensating for disc wear. Such adjustment has traditionally been performed manually when the operator detects a decrease in clutch engaging effort or a decrease in transmitted torque. Such manual adjustment is labor intensive, particularly since it typically requires at least partial disassembly of the clutch assembly to provide access to the adjusting ring. Such adjustment may also be postponed or neglected by some operators until after wear exceeds tolerances.

Various slack adjusting devices have been proposed to automatically adjust a clutch to compensate for clutch wear, thus obviating the need for manual adjustment. Such devices typically comprise relatively complex worm wheel driven configurations which are relatively expensive to manufacture and assemble, which cannot be used on stock clutches, and which have proven somewhat unreliable in use. Such automatic slack adjusters also typically do not have a direct bearing on clutch operation and thus cannot be used to control the maximum torque transmitting capacity of the clutch. Examples of such prior art self-adjusting clutch mechanisms can be found in U.S. Pat. No. 4,189,043 to Steinhagen, U.S. Pat. No. 4,445,600 to Schmidt, and U.S. Pat. No. 5,090,536 to Asada.

OBJECTS AND SUMMARY OF THE INVENTION

It is therefore an object of the invention to provide a relatively simple yet inexpensive self-adjusting mechanism for compensating for the wear of friction clutches.

In accordance with a first aspect of the invention, this object is achieved by providing a clutch comprising a clutch face plate, an adjusting ring, and a self-adjusting mechanism. The self-adjsuting mechanism includes a sensor which senses the thickness of a gap between the adjusting ring and the face plate when the clutch is in a first, preferably engaged, position, and a ratchet mechanism, responsive to the sensor, which decreases the thickness of the gap when the clutch moves into a second, preferably disengaged, position.

The sensor preferably comprises a mechanical sensing member which engages a surface of one of the adjusting ring and the face plate. The self-adjusting mechanism preferably further includes a system of levers which is mounted on the other of the adjusting ring and the face plate and on which is mounted the sensing member, and the ratchet mechanism preferably comprises a plurality of ratchet teeth fixed to the one of the adjusting ring and the face plate, and a pawl which is mounted on the system of levers and which engages the teeth. The system of levers comprises a sensing lever which supports the sensing member and a pawl support lever which supports the pawl, each of the sensing lever and the pawl support lever being pivotally supported on the other of the adjusting ring and the face plate.

Means also should be provided for driving the pawl support lever to advance the pawl when the clutch moves into the second position, and preferably comprises a cable connected to the pawl support lever and to the clutch linkage.

Another object of the invention is to provide a self-adjusting clutch mechanism which is capable of controlling the maximum torque transmitting capacity of a clutch by varying the amount of slack adjustment in a given adjustment operation.

In accordance with another aspect of the invention, this object is achieved by providing a self-adjusting mechanism of the type described above in which the length of the pawl support lever is adjustable.

Yet another object of the invention is to provide a method of automatically adjusting a clutch to compensate for wear of the friction discs of the clutch.

In accordance with yet another aspect of the invention, this object is achieved by mechanically sensing the thickness of the gap when the clutch is engaged; and rotating the adjusting ring relative to the face plate, upon disengagement of the clutch, via operation of a ratchet mechanism, thereby shortening the gap.

A particularly preferred additional step includes adjusting the stroke of the pawl for a designated gap thickness between the face plate and the adjusting ring, thereby adjusting the amount of rotation of the adjusting ring upon clutch adjustment. This in turn adjusts the maximum torque transmitting capacity of the clutch.

Other objects, features, and advantages of the present invention will become apparent to those skilled in the art from the following detailed description and the accompanying drawings. It should be understood, however, that the detailed description and specific examples, while indicating preferred embodiments, are given by way of illustration and not of limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings and with like reference numerals represent like parts without, and in which.

DETAILED DESCRIPTION OF THE PREFERRED EMBODIMENTS

1. Resume

Pursuant to the invention, a self-adjusting mechanism is provided for compensating for wear of over-center clutches and the like and is adapted to mechanically sense clutch wear or slack when the clutch is engaged and to compensate for such wear or slack upon disengagement of the clutch. The self-adjusting mechanism preferably comprises a relatively durable and simple ratchet mechanism including teeth mounted on the adjusting ring and a pawl mounted on the clutch face plate. The pawl retracts upon clutch engagement by an amount determined by the thickness of the gap between the adjusting ring and the face plate which is in turn dependent at least in part on clutch wear, and advances upon clutch disengagement by. Slack adjustment takes place when the pawl engages a new tooth upon retraction and then advances upon clutch disengagement to drive the tooth and thus the adjusting ring to rotate on the hub. The maximum stroke of the pawl, and thus the minimum adjusted gap between the adjusting ring and the face plate and the maximum torque transmitting capacity of the clutch, can be set by varying the effective length of the lever assembly supporting the pawl.

2. System Overview

Figure 1:
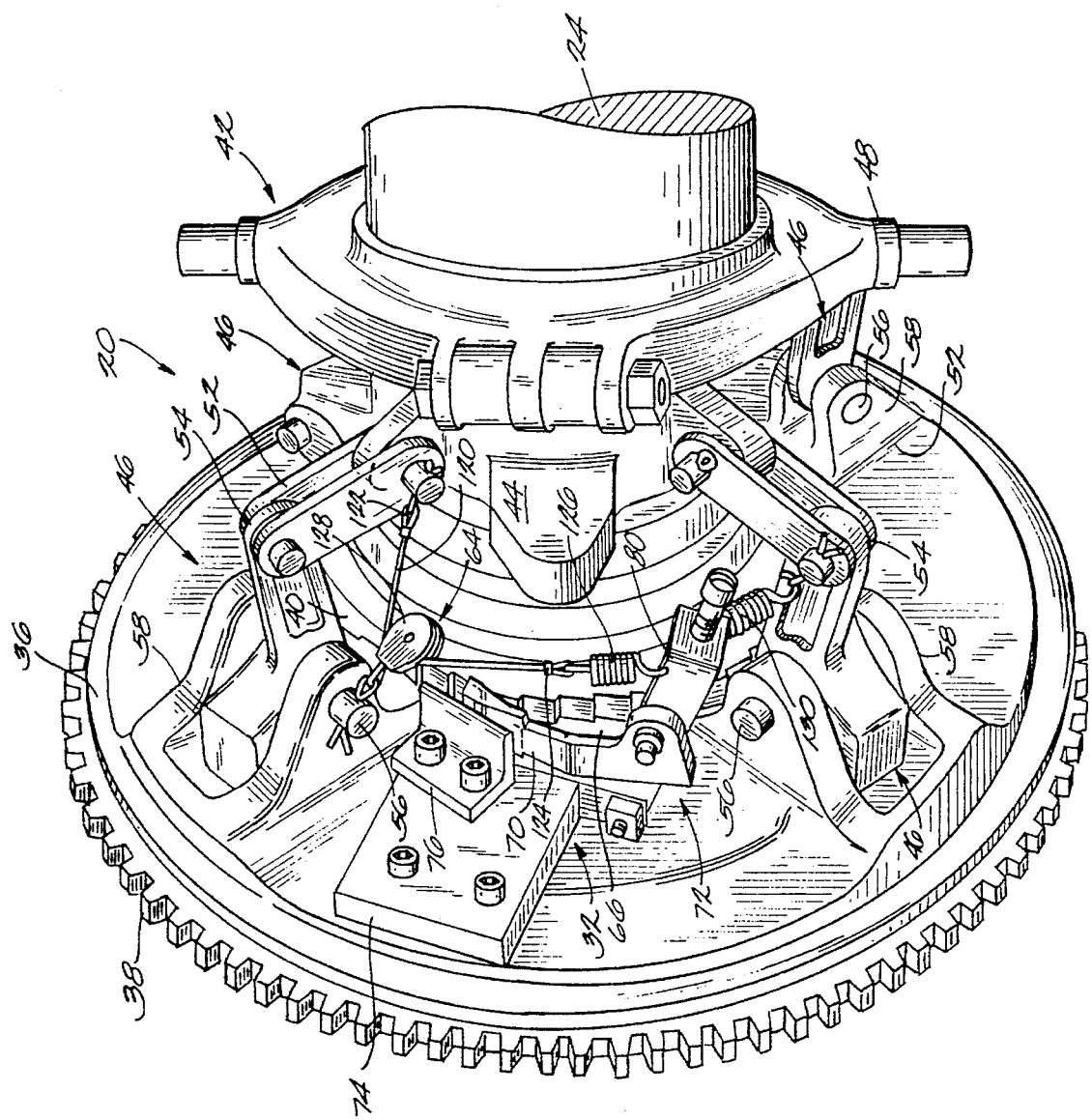
FIG. 1 is a perspective view of a clutch having an automatic self-adjusting mechanism constructed in accordance with a preferred embodiment of the present invention and illustrating the clutch in an engaged condition.
Figure 2:
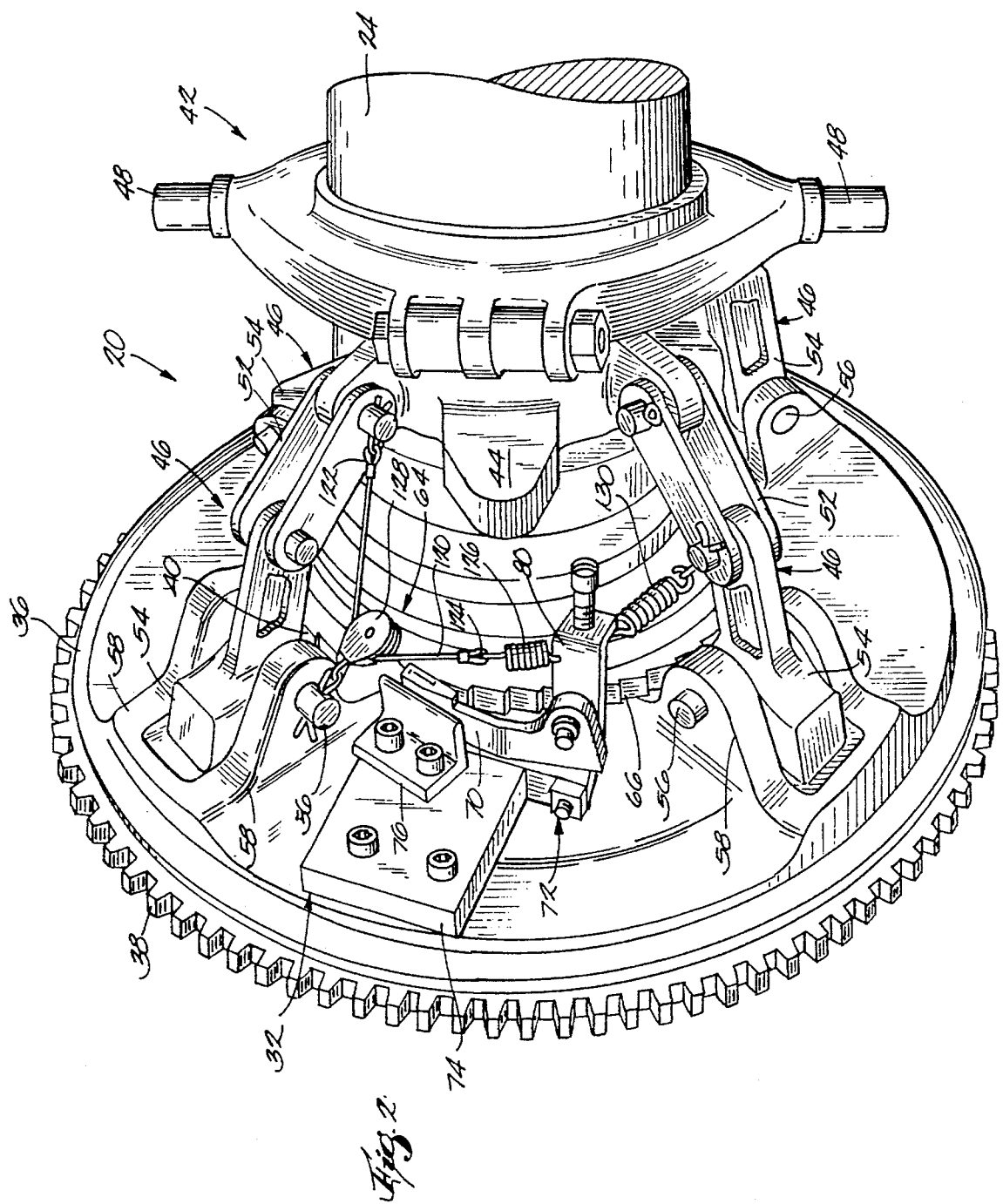
FIG. 2 is a perspective view corresponding to FIG. 1 and illustrating the clutch in a disengaged condition.
Figure 3:
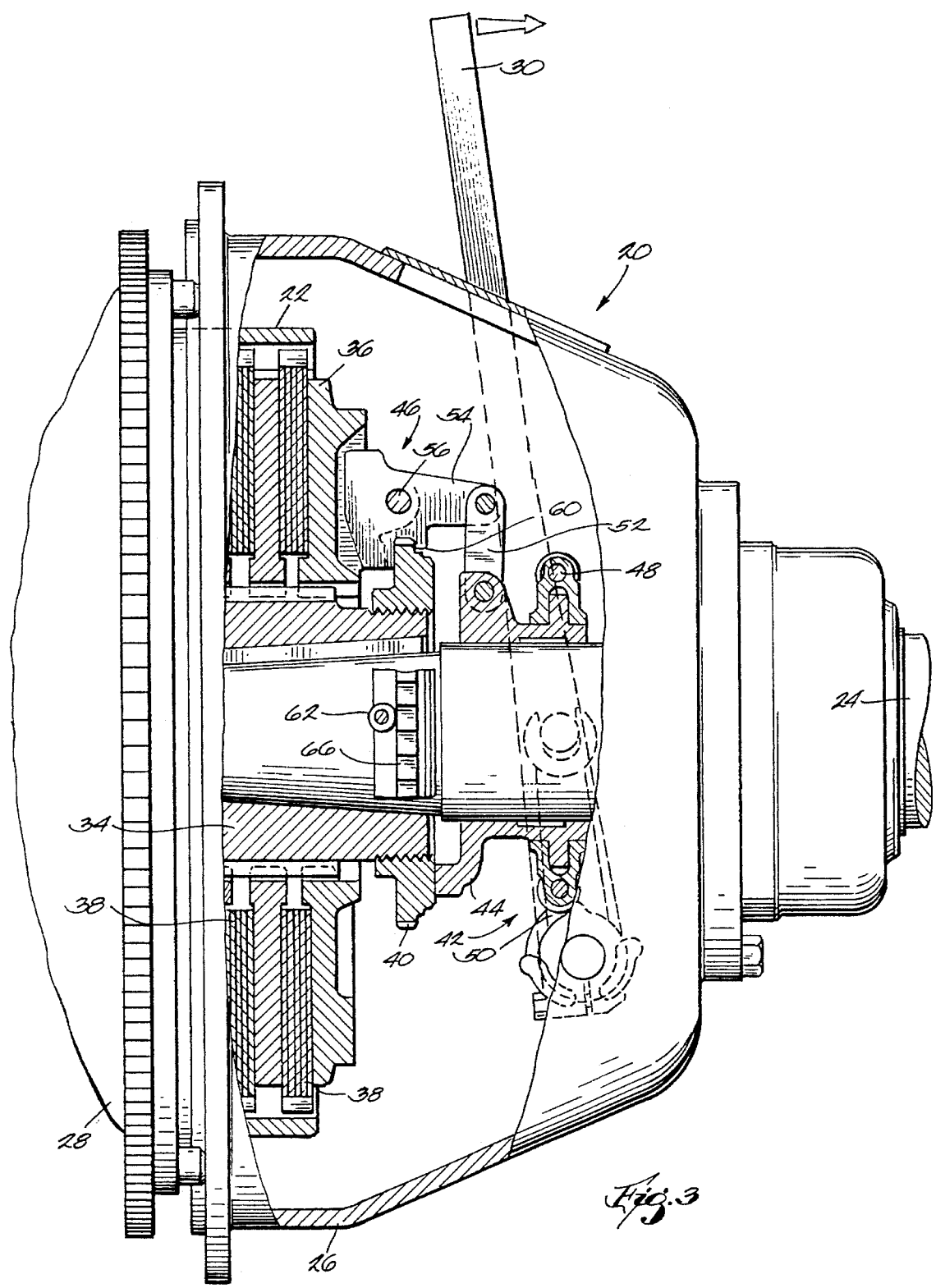
FIG. 3 is a partially sectional side elevation view of the clutch of FIGS. 1 and 2 illustrating the clutch in its engaged condition.

Referring now to the drawings and the FIGS. 1-3 in particular, a clutch 20 which in the illustrated embodiment is an over-center power take-off (PTO) clutch is provided for selectively transferring torque from a drive member 22 to a driven shaft 24. In the illustrated embodiment, the drive member 22 comprises a drive ring (FIG. 3) extending into a clutch housing 26 from a prime mover housing 28 and connected to a flywheel or the like, and the driven shaft 24 extends rearwardly from the clutch housing 26 for connection to a driven device. An actuating lever 30 for the clutch 20 protrudes from the clutch housing 26 and is used to manually engage and disengage the clutch 20. A self-adjusting mechanism 32 is also mounted on the clutch 20 to compensate for wear as detailed below.

Clutch 20 is, except for the provision of the inventive self-adjusting mechanism 32, conventional. Clutch 20 includes a hub 34, a face plate 36, a disc stack 38, and an adjusting ring 40. The hub 34 is non-rotatably fixed to the shaft 24, and face plate 36 is splined or otherwise slidably mounted on the hub 34 so as to compress the disc stack upon clutch engagement to transfer torque from the drive ring 22 to the hub 34. The adjusting ring 40 is threadedly mounted on the hub 34 so as to be axially movable on the hub for slack adjustment.

Clutch 20 also includes a linkage assembly 42 for transferring manual actuating forces from the lever 30 to the face plate 36. Linkage assembly 42 includes a sliding sleeve 44, a plurality (4 in the illustrated embodiment) of over-center lever arm assemblies 46, and yoke 48. The yoke 48 is mounted on the sliding sleeve 44 by a bearing (not shown) and receives arms 50 which are in turn connected to the actuating lever 30. Each over-center lever arm assembly 46 includes a pivot link 52 having a first end connected to the sliding sleeve 44 and a second end connected to a lever arm 54 which is in turn connected by a pivot pin 56 to a clevis 58 extending from the face plate 36. Each of the lever arms 54 also has a recess 60 which engages a fulcrum formed on the outer periphery of the adjusting ring 40 such that, when lever 30 is pivoted in one direction or the other, the face plate 36 is shifted axially on the hub 34 to engage or disengage the clutch 20 as the lever arms 54 pivot about pins 56 against the adjusting ring 40.

As can be appreciated from the drawings, the thickness of the gap between the adjusting ring 40 and the face plate 36 determines the point at which the maximum forward stroke of the face plate 36 terminates due to the interrelationship between the lever arm assemblies 46, the face plate 36, and the adjusting ring 40. The position of the adjusting ring 40 is in turn determined by the extent to which it is threaded onto the hub 34. Thus, the forward stroke of the face plate 36 upon actuation of the lever 30, and thus the amount of slack and/or torque transmittal capacity of the clutch 20, is reflected by the thickness of the gap between the adjusting ring 40 and the face plate 36. The inventive self-adjusting mechanism 32 is designed to maintain this thickness in a designated, variable range and will now be described.

3. Construction of Self-Adjusting Mechanism

Referring now to FIGS. 1–10, the self-adjusting mechanism 32 is adapted to sense mechanically the slack or degree of wear of the disc stack 38 by sensing the thickness of the gap between the adjusting ring 40 and the face plate 36 when the clutch 20 is engaged, and to shorten this gap by a designated amount when the detected thickness is above tolerance. To this end, the self-adjusting mechanism 32 includes a ratchet mechanism for selectively driving the adjusting ring 40 to rotate on the hub 34, a sensing member 62 for monitoring the thickness of the gap, and a drive assembly 64 for actuating the ratchet mechanism. The ratchet mechanism includes a ratchet ring 66 formed on the outer periphery of the adjusting ring 40 and presenting a plurality of ratchet teeth 68, and a pawl 70 mounted on the clutch face plate 36 via an adjusting lever assembly 72. The adjusting lever assembly 72 of the illustrated embodiment is mounted on the face plate 36 by a support plate 74 which is fixed to the face plate 36 and which also receives a safety stop bracket 76 as detailed below.

Figure 5:
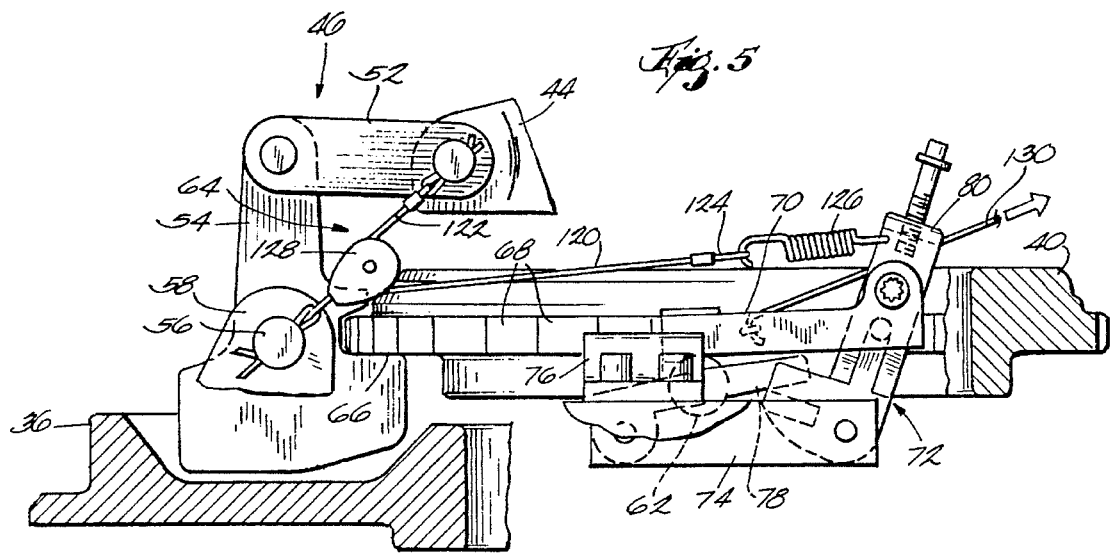
FIG. 5 corresponds to FIG. 4 and illustrates the clutch self-adjusting mechanism in a slack measuring (engaged) position.
Figure 4:
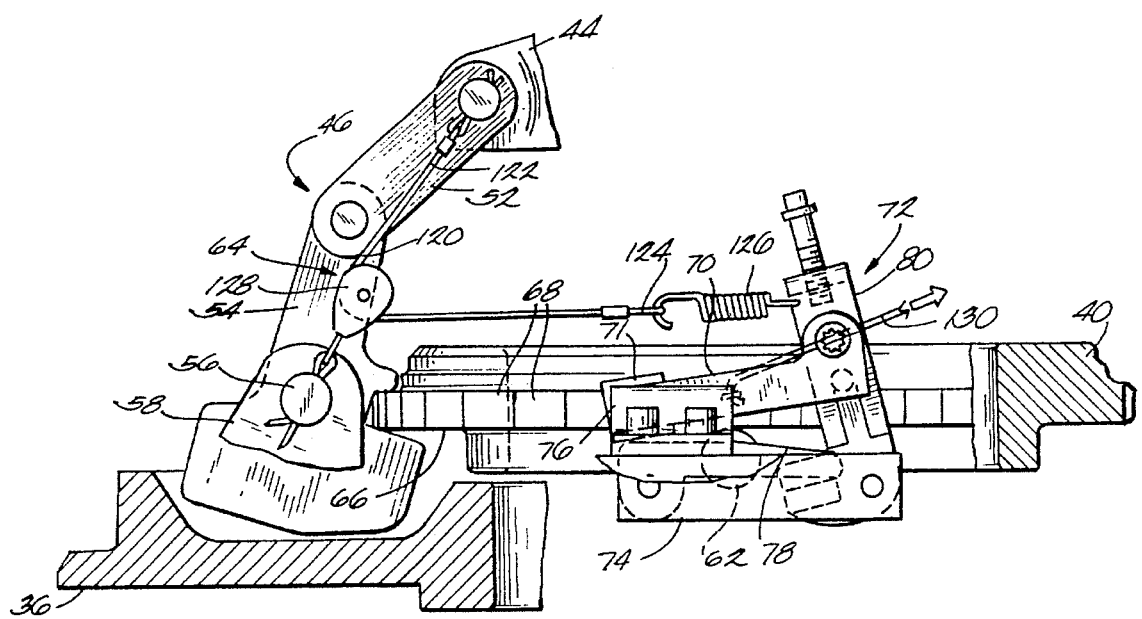
FIG. 4 is a side elevation view of the clutch adjusting mechanism of FIGS. 1 and 3 and of the surrounding portions of the clutch and illustrating the self-adjusting mechanism in a slack adjusting disengaged position.
Figure 6:
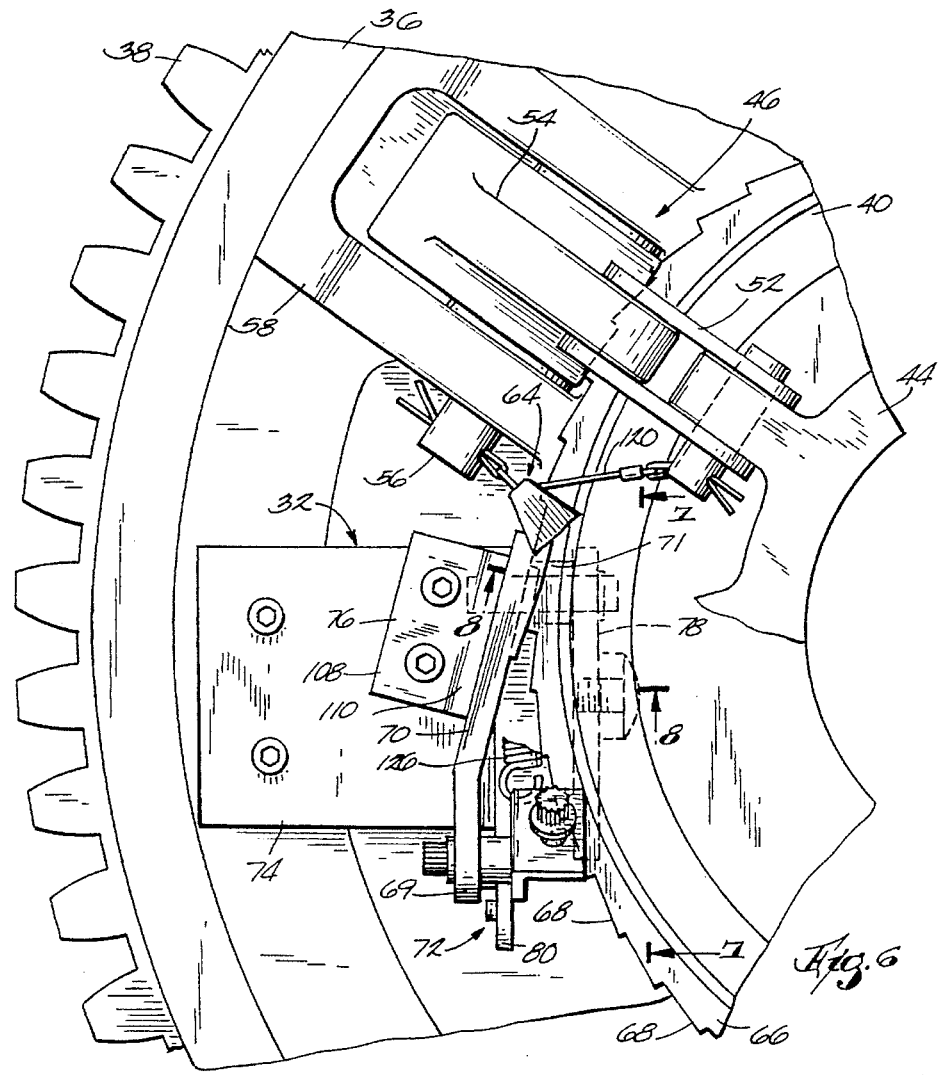
FIG. 6 is a top plan view of the self-adjusting mechanism of FIGS. 1–5 and of the surrounding portion of the clutch.
Figures 7, 8:
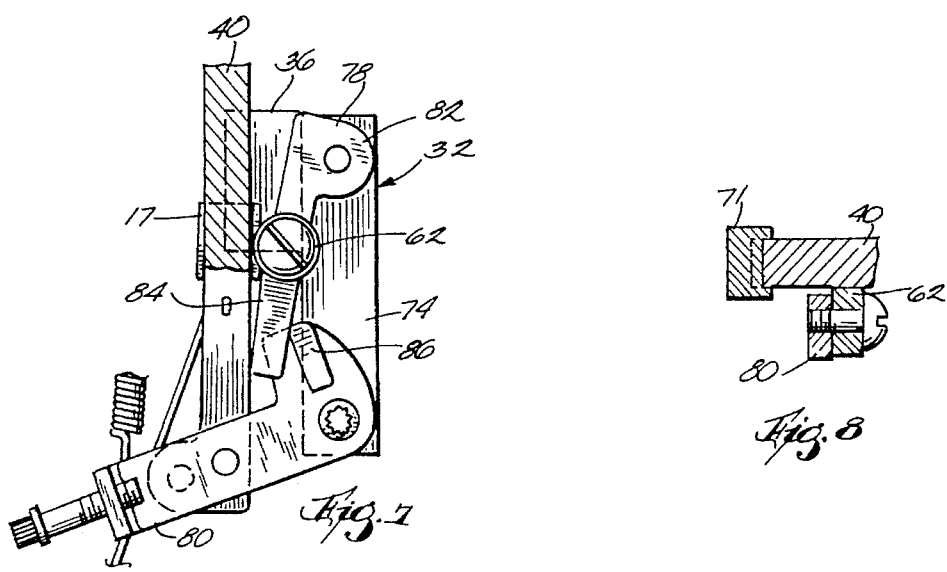
FIG. 7 is a sectional view taken along the lines 7—7 in FIG. 6.
FIG. 8 is a sectional view taken along the lines 8—8 in FIG. 6.
Figure 9:
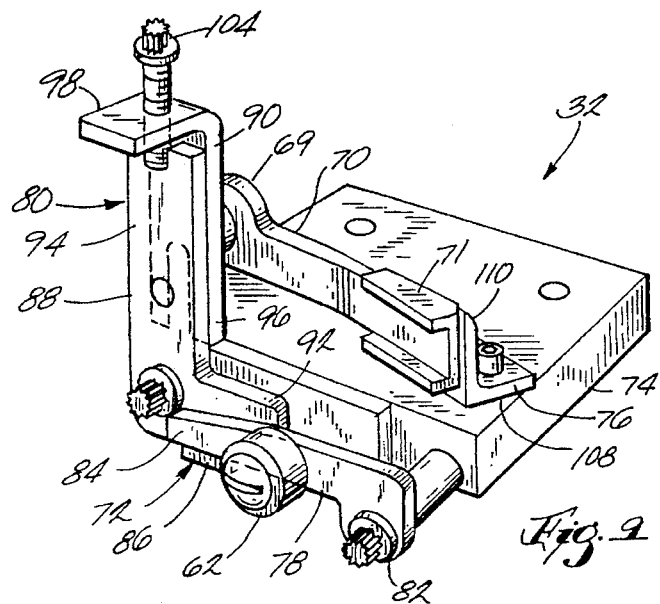
FIG. 9 is a perspective view of a portion of the self-adjusting mechanism of FIGS. 1–8.
Figure 10:
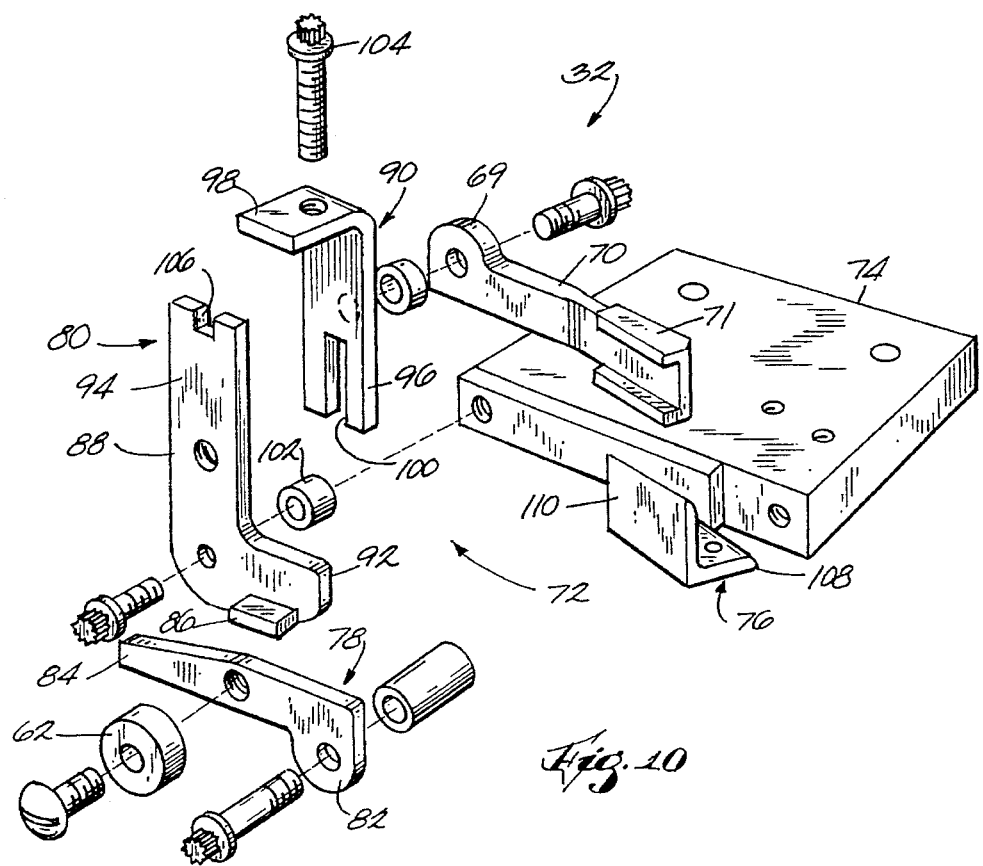
FIG. 10 is an exploded perspective view of the portion of the self-adjusting mechanism illustrated in FIG. 9.

The adjusting lever assembly 72 comprises a sensing lever 78 and a pawl support lever 80 pivotally mounted on opposite ends of the front face of the support plate 74 in a generally facing relationship. The sensing lever 78 has a front ear 82 and an elongated rear arm 84 (FIGS. 9 and 10). The ear 82 receives the pin mounting the lever 78 to the support block 74, and the arm 84 receives the sensing member 62 (a roller in the illustrated embodiment) at a central portion thereof. The roller 62 in turn rides along the front surface of the adjusting ring 40 as illustrated in FIGS. 3, 4, and 5 such that the position of the roller 62 and thus of the sensing lever 78 is determined by the position of the adjusting ring 40 relative to the face plate 36. A front end portion of the rear arm 84 of the sensing lever 78 rests upon a tab 86 of the pawl support lever 80 such that the positions of the sensing lever 78 and the pawl support lever 80 are dependent upon one another.

Referring especially to FIGS. 9 and 10, pawl support lever 80 is generally L-shaped and is formed from lower and upper L-brackets 88 and 90. Lower L-bracket 88 has a first leg 92 presenting the tab 86 and a second leg 94 extending generally upwardly from the first leg 92 as viewed in FIGS. 9 and 10. Upper L-bracket 90 has a first leg 96 extending in parallel with second leg 94 of lower L-bracket 88 and a second leg 98 extending over the end of the second leg 94 of lower L-bracket 88. A notch 100 is formed in the lower end of the first leg 96 of upper L-bracket 90 and engages a bushing 102 attached to the second leg 94 of lower L-bracket 88. A screw 104 is threaded through the second leg 98 of upper L-bracket 90 and engages a notch 106 formed in the top of the second leg 94 of lower L-bracket 88. Upper L-bracket 90 can thus move longitudinally relative to the lower L-bracket 88 via adjustment of the screw 104, thereby adjusting the length of pawl support lever 80 and adjusting the stoke of the pawl 70 upon a designated pivoting of pawl support lever 80.

Pawl 70 comprises a metal arm having a tail 69 pivotally attached to pawl support lever 80 and a head 71 for engaging the teeth 68 of the adjusting ring 40. The front face of head 71 is flanged so as to flank the outer surface of the teeth 68, thereby assuring that the pawl 70 remains on the ratchet ring 66. The rear face of head 71 is designed to engage the safety bracket 76 to arrest pawl advancement as detailed below.

Support plate 74 could be formed integral with the face plate 36 but is bolted to the face plate 36 in the illustrated embodiment so as to permit the use of the self-adjusting mechanism 32 with a stock clutch 20. This presents an improvement over many prior art self-adjusting mechanisms would could not be mounted on unmodified stock clutches.

Safety stop bracket 76 has a first leg 108 bolted or otherwise affixed to the support plate 74 and a second leg 110 presenting an engagement surface for the rear face of the head 71 of the pawl 70. The second leg 110 and the pawl head 71 are related to one another such that advancement of the pawl 70 is limited by the pawl head 71 being clamped between the stop bracket 76 and the ratchet ring 66 when the pawl 70 advances the maximum permissible amount. Stop bracket 76 thus prevents excessive rotation of the adjusting ring 40 and thus limits the reduction of the gap between the adjusting ring 40 and the face plate 36. Consequently, assuming a designated maximum disc stack thickness, the stop bracket 76 limits axial movement of the face plate 36 and thus limits disc stack compression and maximum clutch torque capacity to acceptable levels.

Referring now to FIGS. 1, 2 and 4–6, drive assembly 64 could comprise any device coupling the pawl 70 and/or pawl support lever 80 to the linkage assembly 42 such that the pawl 70 advances upon disengagement of the clutch 20 as illustrated in FIG. 4. In the illustrated embodiment, the drive assembly 64 comprises a block and tackle assembly having a cable 120, a spring 126, and a pulley 128. Cable 120 has a first end 122 connected to the pivot pin connecting the pivot link 52 to the sliding sleeve 44 and a second end 124 connected to the spring 126. The spring 126, though not required for operation of the self-adjusting mechanism 32, connects the second end 124 of the cable 120 to the pawl support lever 80 so as to (1) reduce shocks occurring upon disengagement of the clutch 20, (2) maintain at least limited tension on the cable 120 at all times and (3) permit the cable 120 to have a variable effective length so as to accommodate gaps of different thicknesses between the adjusting ring 40 and the face plate 36. Pulley 128 is located at a generally central portion of the cable 120 to assure that the second end 124 of the cable 120 remains generally perpendicular to the vertical leg of the pawl support lever 80.

Means should also be provided to assure that the sensing member 62 remains in contact with the adjusting ring 40 at all times and that the sensing lever 78 and pawl support lever 80 pivot to retract the pawl 70 upon clutch engagement as illustrated in FIG. 5. To this end, the pawl support lever 80 is biased into the retracted position by a pawl return spring 130 such that, when the tension in the cable 120 is relaxed upon clutch engagement, the pawl support lever 80 is pivoted clockwise as viewed in the drawings under the influence of the pawl return spring 130 resulting in retraction of the pawl 70. Pivotal movement of lever 80 and thus retraction of the pawl 70 is limited by corresponding movement of sensing lever 78 (occurring due to contact between tab 86 of lever 80 and the rear arm 84 of lever 78), which is in turn limited by contact of the sensing member 62 with the adjusting ring 40.

4. Operation of Self-Adjusting Mechanism

Referring first to FIGS. 1, 5, 6, and 7, the thickness of the gap between the adjusting ring 40 and the face plate 36 will vary depending upon the amount of clutch disc stack wear. This gap is mechanically measured upon clutch engagement by engagement of the sensing member or roller 62 with the face of the adjusting ring 40. Since the roller 62 engages the adjusting ring 40 at all times, the levers 78 and 80 pivot upon clutch engagement, resulting in corresponding retraction of the pawl 70 away from its normal tooth engaging position. The amount of pawl retraction increases as the thickness of the gap as measured by the roller 62 increases. The retraction stroke of the pawl 70 for a given gap thickness, and, accordingly, the advancing stroke of the pawl 70 upon disengagement (as detailed below), is in turn determined by the effective length of the pawl support lever 80 which, as detailed above, is determined by manual adjustment of the screw 104.

Assuming that clutch plate wear as sensed by sensing roller 62 is within acceptable limits, the pawl 70 does not retract sufficiently to engage the next tooth 68 on ratchet ring 66. Subsequent clutch disengagement thus does not result in any adjustment since forward movement of the pawl 70 is arrested upon engagement of the pawl with the most forward tooth 68. Assuming, on the other hand, that clutch wear as sensed by sensing member 62 is sufficient to warrant correction, the pawl 70 retracts enough upon clutch engagement to slip onto the next tooth 68 on the ratchet ring 66. Then, upon subsequent disengagement of the clutch 20 and corresponding advancement of the pawl 70, the adjusting ring 40 is driven by pawl 70 (under the driving force of drive assembly 64) to rotate on the hub 24, thereby moving axially on its threads and compensating for clutch wear. The amount of this adjustment and thus the final maximum torque transmitting capacity of the clutch 20, can be varied by adjustment of the screw 104 as described above.

Many changes and modifications could be made to device described above without departing from the spirit of the invention. The scope of such changes will become apparent from a reading of the appended claims.

I claim:

1. A clutch comprising:
   A. a clutch face plate which is axially slidable to engage said clutch;
   B. a clutch linkage assembly which selectively drives said face plate axially to engage said clutch;
   C. an adjusting ring which extends in parallel with said face plate and which is movable axially with respect to said face plate upon relative rotation therebetween to effect clutch adjustment, said adjusting ring supporting a fulcrum for said clutch linkage assembly; and
   D. a self-adjusting mechanism including
      (1) a sensor which senses the thickness of a gap between said adjusting ring and said face plate when said clutch is engaged, and
      (2) a ratchet mechanism, responsive to said sensor, which decreases the thickness of said gap when said clutch disengages, said ratchet mechanism comprising
         (A) a ratchet ring affixed to said adjusting ring and presenting a plurality of ratchet teeth, and
         (B) a pawl (1) which is coupled to said sensor, (2) which retracts without rotating said ratchet ring when said clutch is engaged, and (3) which advances when said clutch is disengaged to engage one of said ratchet teeth, thereby driving said ratchet ring and adjusting ring to rotate as a unit and shortening said gap.

2. A clutch comprising:
   A. a clutch face plate;
   B. an adjusting ring; and
   C. a self-adjusting mechanism including
      (1) a sensor which senses the thickness of a gap between said adjusting ring and said face plate when said clutch is in a first position, and
      (2) a ratchet mechanism, responsive to said sensor, which decreases the thickness of said gap when said clutch moves into a second position, wherein
         said sensor comprises a mechanical sensing member which engages a surface of one of said adjusting ring and said face plate,
         said self-adjusting mechanism further includes a system of levers which is mounted on the other of said adjusting ring and said face plate and on which is mounted said sensing member, and
         said ratchet mechanism comprises
            (1) a plurality of ratchet teeth fixed to said one of said adjusting ring and said face plate, and
            (2) a pawl which is mounted on said system of levers and which engages said teeth.

3. A clutch as defined in claim 2, wherein said system of levers comprises a sensing lever which supports said sensing member and a pawl support lever which supports said pawl, each of said sensing lever and said pawl support lever being pivotally supported on said other of said adjusting ring and said face plate.

4. A clutch as defined in claim 3, wherein the length of said pawl support lever is adjustable.

5. A clutch as defined in claim 3, further comprising means for driving said pawl support lever to advance said pawl when said clutch moves into said second position.

6. A clutch as defined in claim 5, wherein said means for driving comprises a cable connected to said pawl support lever.

7. A clutch as defined in claim 2, wherein said first and second positions comprise engaged and disengaged positions, respectively.

8. A clutch for transferring torque from a drive member to an output shaft, said clutch comprising:
   A. a hub fixedly mounted on said output shaft;
   B. a clutch face plate which is slidably supported on said hub;
   C. a clutch linkage assembly which selectively drives said face plate towards said drive member to engage said clutch;
   D. an adjusting ring which is threadedly mounted on said hub and which presents a fulcrum for said clutch linkage assembly; and
   E. a self-adjusting mechanism including
      (1) a sensor which senses the thickness of a gap between said adjusting ring and said face plate when said clutch is in an engaged position, and
      (2) a ratchet mechanism, responsive to said sensor, which rotates said adjusting ring on said hub to shorten said gap by a designated amount when said clutch disengages, said ratchet mechanism comprising
         (A) a ratchet ring affixed to said adjusting ring and presenting a plurality of ratchet teeth, and
         (B) a pawl (1) which is coupled to said sensor, (2) which retracts without rotating said ratchet ring when said clutch is engaged, and (3) which advances when said clutch is disengaged to engage one of said ratchet teeth, thereby driving said ratchet ring and adjusting ring to rotate about said hub as a unit and shortening said gap.

9. A clutch as defined in claim 8, further comprising means for adjusting said designated amount.

10. A clutch for transferring torque from a drive member to an output shaft, said clutch comprising:
    A. a hub fixedly mounted on said output shaft;
    B. a clutch face plate which is slidably supported on said hub
    C. a clutch linkage assembly which selectively drives said face plate towards said drive member to engage said clutch;
    D. an adjusting ring which is threadedly mounted on said hub; and E. a self-adjusting mechanism including
   (1) a sensor which senses the thickness of a gap between said adjusting ring and said face plate when said clutch is in an engaged position, and
   (2) a ratchet mechanism, responsive to said sensor, which rotates said adjusting ring on said hub to shorten said gap by a designated amount when said clutch moves into a disengaged position, wherein
   said sensor comprises a sensing member engaging a surface of said adjusting ring,
   said self-adjusting mechanism further includes a system of levers which is mounted on said face plate and on which is mounted said sensing member, the positions of said sensing member and said system of levers being determined by the thickness of said gap, and
   said ratchet mechanism comprises
      (1) a plurality of ratchet teeth fixed to said adjusting ring, and
      (2) a pawl mounted on said system of levers and having a position which varies with the position of said system of levers.

11. A clutch as defined in claim 10, wherein said system of levers comprises a sensing lever which supports said sensing member and a pawl support lever which supports said pawl, each of said sensing lever and said pawl support lever being pivotally supported on said face plate.

12. A clutch as defined in claim 11, further comprising a support plate which is supported on said face plate and on which said sensing lever and said pawl support lever are independently mounted.

13. A clutch as defined in claim 11, wherein the effective length of said pawl support lever is adjustable.

14. A clutch as defined in claim 10, further comprising means for driving said pawl to advance upon disengagement of said clutch.

15. A clutch as defined in claim 14, wherein said means for driving comprises a cable connected to said pawl support lever and to said clutch linkage.

16. A clutch as defined in claim 15, wherein said clutch linkage comprises a sleeve which is slidably mounted on said shaft and a lever assembly which couples said sleeve to said face plate and to said adjusting ring, and wherein said cable is connected to one of said lever assembly and said sleeve.

17. A clutch as defined in claim 10, further comprising a stop bracket which limits advancement of said pawl upon disengagement of said clutch.

18. A clutch as defined in claim 10, wherein said sensing member comprises a roller contacting a front surface of said adjusting ring.

19. A clutch for transmitting torque from a drive member to an output shaft, said clutch comprising:
A. a hub fixedly mounted on said output shaft;
B. a clutch face plate which is slidably supported on said hub;
C. a clutch linkage assembly which selectively drives said face plate towards said drive member to engage said clutch;
D. an adjusting ring which is threadedly mounted on said hub; and
E. a self-adjusting mechanism including
   (1) a sensor which senses the thickness of a gap between said adjusting ring and said face plate when said clutch is in an engaged position, and
   (2) a ratchet mechanism, responsive to said sensor, which shortens said gap by a designated amount when said clutch moves into a disengaged position, said ratchet including
      (A) a plurality of ratchet teeth fixed to said adjusting ring, and
      (B) a pawl mounted on said face plate and having a position which varies with the thickness of said gap.

20. A method of adjusting a clutch, said clutch including a clutch face plate, an adjusting ring which extends in parallel with and which is spaced axially from said face plate by a gap, and a clutch linkage assembly which selectively drives said face plate towards a drive member to engage said clutch, said adjusting ring presenting a fulcrum for said clutch linkage assembly, the thickness of [a] said gap between said face plate and said adjusting ring varying upon rotation of said adjusting ring relative to said face plate, said method comprising:
A. mechanically sensing the thickness of said gap when said clutch is engaged by retracting a pawl along a ratchet ring by an amount corresponding to the thickness of said gap, said ratchet ring being affixed to said adjusting ring and presenting a plurality of ratchet teeth; and
B. upon clutch disengagement, extending said pawl to engage one of said ratchet teeth, thereby driving said ratchet ring and adjusting ring to rotate as a unit and shortening said gap.

21. A method as defined in claim 20, wherein said rotating step comprises applying an actuating force to said pawl by said linkage assembly when said clutch is disengaged.

22. A method as defined in claim 20, further comprising applying a retraction force to said pawl upon engagement of said clutch.

23. A method as defined in claim 20, further comprising adjusting the stroke of said pawl for a designated gap thickness between said face plate and said adjusting ring, thereby adjusting the amount of rotation of said adjusting ring upon clutch adjustment.

* * * * *